United States Patent
Zha et al.

(10) Patent No.: US 10,907,464 B2
(45) Date of Patent: Feb. 2, 2021

(54) AUTOMATIC CONTROLLING OF DRILLING WEIGHT ON BIT

(71) Applicant: CONOCOPHILLIPS COMPANY, Houston, TX (US)

(72) Inventors: Yang Zha, Houston, TX (US); Stacey C. Ramsay, Houston, TX (US); Son V. Pham, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 15/953,043

(22) Filed: Apr. 13, 2018

(65) Prior Publication Data
US 2018/0334898 A1 Nov. 22, 2018

Related U.S. Application Data

(60) Provisional application No. 62/508,806, filed on May 19, 2017.

(51) Int. Cl.
| | |
|---|---|
| E21B 44/02 | (2006.01) |
| G06F 17/13 | (2006.01) |
| E21B 3/04 | (2006.01) |

(52) U.S. Cl.
CPC ............ *E21B 44/02* (2013.01); *E21B 3/04* (2013.01); *G06F 17/13* (2013.01)

(58) Field of Classification Search
CPC .................................................... E21B 44/02
USPC .......................................................... 175/27
See application file for complete search history.

(56) References Cited

U.S. PATENT DOCUMENTS

| | | |
|---|---|---|
| 5,044,198 A | 9/1991 | Ho |
| 5,421,420 A | 6/1995 | Malone et al. |
| 9,279,317 B2 | 3/2016 | Lee |
| 2008/0314641 A1 | 12/2008 | McClard |
| 2014/0190747 A1 | 7/2014 | Hay |
| 2014/0196949 A1 | 7/2014 | Hareland et al. |
| 2017/0306702 A1* | 10/2017 | Summers ............... E21B 44/02 |

FOREIGN PATENT DOCUMENTS

| | | |
|---|---|---|
| CA | 2836830 A1 | 1/2013 |
| WO | 2015041632 A1 | 3/2015 |

OTHER PUBLICATIONS

International Search Report, PCT/US2018/027591 dated Jul. 11, 2018; 2 pgs.
Kucs, Richard, et al—"Automated Real-Time Hookload and Torque Monitoring", 2008, IADC/SPE Drilling Conference held in Orlando, FL Mar. 4-6, 2008, IADC/SPE 112565, SPE International, Society of Petroleum Engineers, pp. 1-14; 14 pgs.
(Continued)

*Primary Examiner* — Taras P Bemko

(57) ABSTRACT

A method for automatically controlling drilling weight-on-bit for using a drill-string to drill along a wellbore includes establishing a drill-string model and a wellbore model, wherein the drill-string has a plurality of components along the length thereof, and the wellbore has a plurality of sections. A surface tension data of the drill-string can be acquired, and a friction coefficient-depth distribution can be obtained by calibrating the surface tension data in the drill-string model and wellbore model, and the drilling weight-on-bit can be predicted according to the calibrated drill-string and wellbore models.

23 Claims, 6 Drawing Sheets

(56) References Cited

OTHER PUBLICATIONS

Pink, Tony, et al—"Closed Loop Automation of Downhole Weight on Bit Improves Sliding Performance and Reduces Conservatism in Unconventional Horizontal Well Development", 2013, SPE Annual Technical Conference and Exhibition held in New Orleans, LA Sep. 30-Oct. 2, 2013, SEP 166428, Society of Petroleum Engineers, pp. 1-14; 14 pgs.
Mason, Colin, et al—"Step Changes Needed to Modernize T&D Software", 2007, SPE/IADC Drilling Conference held in Amsterdam, The Netherlands Feb. 20-22, 2007, SPE/IADC 104609, Society of Petroleum Engineers, pp. 1-12; 12 pgs.
Fazaelizadeh, Mohammad—"Real Time Torque and Drag Analysis During Directional Drilling", 2013, University of Calgary, Thesis, Mar. 2013, 200 pgs.

\* cited by examiner

AUTOMATIC CONTROLLING OF DRILLING WEIGHT ON BIT

This application is a non-provisional application which claims benefit under 35 USC § 119(e) to U.S. Provisional Application Ser. No. 62/508,806 filed May 19, 2017, entitled "AUTOMATIC CONTROLLING OF DRILLING WEIGHT ON BIT" which is incorporated herein in its entirety.

FIELD OF THE DISCLOSURE

The disclosure generally relates to a method and system for automatic controlling of the drilling weight on bit, and more particularly to a method and system for automatic controlling of the drilling weight on bit without having to measure the friction force.

BACKGROUND OF THE DISCLOSURE

In well construction and completion operations, as shown in FIG. 1, a wellbore of multiple sections is formed to access hydrocarbon-bearing formations (e.g., crude oil and/or natural gas) by drilling. Drilling is accomplished by utilizing a drill bit that is mounted on the end of a drill string. To drill within the wellbore to a predetermined depth, the drill string is often rotated by a top drive or rotary table on a surface platform or rig, and/or by a downhole motor mounted towards the lower end of the drill string. A human driller in the driller's cabin will monitor the drilling progress and condition, and adjust the drilling parameters according to different needs.

"Weight on bit" or "WOB" as expressed in the oil industry, is the amount of downward force exerted on the drill bit and is normally measured in thousands of pounds. Weight on bit is provided by drill collars, which are thick-walled tubular pieces machined from solid bars of steel, usually plain carbon steel but sometimes of nonmagnetic nickel-copper alloy or other nonmagnetic premium alloys. Gravity acts on the large mass of the collars to provide the downward force needed for the bits to efficiently break rock.

To accurately control the amount of force applied to the bit, the driller carefully monitors the surface weight measured while the bit is just off the bottom of the wellbore. Next, the drill-string (and the drill bit), is slowly and carefully lowered until it touches bottom. After that point, as the driller continues to lower the top of the drill-string, more and more weight is applied to the bit, and correspondingly less weight is measured as hanging at the surface. If the surface measurement shows 20,000 pounds [9080 kg] less weight than with the bit off bottom, then there should be 20,000 pounds force on the bit (in a vertical hole). Some downhole MWD sensors can measure weight-on-bit more accurately and transmit the data to the surface.

The drilling industry typically use downhole equipment located near or at the Bottom Hole Assembly (BHA) to monitor weight on bit. However, such equipment is expensive to install and maintain, and the returned WOB data is of low sampling rate unless wired pipe is installed. Others have developed methods to monitor the trends of surface hookload and estimate the friction loss along the wellbore, but have not attempted to control the hookload according to the real time data.

However, for deviated wells or even horizontal wells, controlling the drill bit is less straight forward. Wellbore friction and tortuosity in horizontal or deviated wells decrease the efficiency of weight-on-bit transfer from the drilling rig to the bit. Insufficient weight on bit will lead to reduced rate of penetration and increasing drilling time. Excessive weight on bit will cause drill-string buckling and premature failure of the bit, leading to unplanned trips that will increase the drilling cost.

There are two types of approaches the industry mostly uses to adjust the downhole weight on bit: 1) using downhole sensors to measure the actual weight on bit, then adjusting surface hookload to achieve a desired weight on bit. For example U.S. Pat. No. 5,421,420 provides a device attached to a drill bit having asymmetrical cutters, or U.S. Pat. No. 9,279,317 provides downhole measured inclination and weight to correct sensor measurements. 2) Monitoring surface hookloads during drilling and comparing that with pre-estimated hookload values based on a preset of friction factors, and any change in hookload trends are then identified and drilling parameters are changed manually. For example, CA2836830 discloses using surface hookload to build friction model, and using friction model to predict WOB and torque on bit (TOB).

The above methods have not attempted to automatically control weight-on-bit using friction models obtained from surface measurements. Being able to maintain correct weight on bit is key to drilling efficiency and cost reduction and thus better methods are needed in the art. This application addresses one or more of those needs.

SUMMARY OF THE DISCLOSURE

Therefore, it is proposed that accurately measuring and controlling weight on bit in a real time manner is crucial to maintaining high drilling efficiency. This disclosure therefore presents a robust method to estimate and control the downhole WOB, through processing and optimization of real time surface data. No real-time calibration using downhole data is necessary.

The method comprises primarily 4 steps: (1) constructing a drill-string and wellbore model in the computer software; (2) capturing surface tension when drill bit is off-bottom; (3) calibrating the drill-string-wellbore friction model using captured surface tension measurements; and (4) predicting and controlling downhole WOB using surface tension. One or more steps may be performed during drilling of each one section of pipe in order to further calibrate the drill-string-wellbore friction model.

As used herein, "drill-string" means a column, or string, of drill pipe that transmits drilling fluid (via the mud pumps) and torque (via the top drive) to the drill bit. The drill string is typically made up of three sections: bottom hole assembly (BHA), transition pipes, and drill pipes. The function of the transition pipes is to provide a flexible transition between the drill collars and the drill pipe, which helps reducing the number of fatigue failures seen directly above the BHA. Transition pipes also helps to add additional weight to the drill bit. Drill pipe makes up the majority of the drill string back up to the surface. Each drill pipe comprises a long tubular section with a specified outside diameter (e.g. 3½ inch, 4 inch, 5 inch, 5½ inch, 5⅞ inch, 6⅝ inch). At each end of the drill pipe tubular, larger-diameter portions called the tool joints are located. The tool joint connections are threaded which allows for the make of each drill pipe segment to the next segment.

As used herein, BHA means an assembly at the bottom of the drill-string that touches and drills the targeted area. A BHA typically comprises a drill bit, which is used to break up the rock formations; drill collars, which are heavy, thick-walled tubes used to apply weight to the drill bit; and drilling stabilizers, which keep the assembly centered in the hole. The BHA may also contain other components such as a downhole motor and rotary steerable system, measurement while drilling (MWD), and logging while drilling (LWD) tools. The components are joined together using rugged threaded connections.

As used herein, "surface tension" (or interchangeably "hookload" herein) refers to the total force pulling down on the hook that connects the drill-string to the derrick. This total force includes the weight of the drill-string in air, the drill collars and any ancillary equipment, reduced by any force that tends to reduce that weight, such as friction along the wellbore wall (especially in deviated wells) and, importantly, buoyant forces on the drill-string caused by its immersion in drilling fluid.

As used herein, "weight on bit" or WOB means the amount of downward force exerted on the drill bit, and is normally measured in thousands of pounds. Weight on bit is provided by drill collars as applied to the drill bit. WOB can be measured by subtracting the weight of drill-bit off bottom from the surface tension (or hookload) measured while drilling. For example, if the surface measurement shows 20,000 pounds less weight than with the bit off bottom, then there should be 20,000 pounds force on the bit (in a vertical hole).

As used here, "friction coefficient" refers to the value that shows the relationship between the force of friction between two objects and the normal reaction between the objects that are involved.

As used herein, "out of slips" means the slips are not in place to suspend or in anyway affect the hookload readings.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The invention includes any one or more of the following embodiment(s), in any combination(s) thereof:

A method of automatically controlling drilling weight-on-bit for using a drill-string to drill along a wellbore, the drill-string having at least a bottom hole assembly (BHA), transition pipes, and drill pipes, and the BHA comprising a drill bit, drill collars, and drilling stabilizers, the method comprising: a) establishing a drill-string model and a wellbore model, wherein the drill-string has a plurality of components along the length thereof, and the wellbore has a plurality of sections; b) acquiring a surface tension data of the drill-string; c) obtaining friction coefficient-depth distribution by calibrating the surface tension data; and d) predicting the drilling weight-on-bit according to the calibrated drill-string and wellbore model.

A method of automatically controlling drilling weight-on-bit for using a drill-string to drill along a wellbore, wherein the wellbore model in step a) is established according to a list of the well sections each having specified diameter, depth, length, heading and friction coefficient.

A method of automatically controlling drilling weight-on-bit for using a drill-string to drill along a wellbore, wherein the drill-string model in step a) is established according to a list of the components along the drill-string, each components having a specified diameter, length, weight, density and moment of inertia.

A method of automatically controlling drilling weight-on-bit for using a drill-string to drill along a wellbore, wherein in step a) when additional components are being added to the drill-string so as to lower the drill bit inside the wellbore, the drill-string model is automatically updated for the depth, location and contact points of each of the added string components.

A method of automatically controlling drilling weight-on-bit for using a drill-string to drill along a wellbore, wherein the surface tension data in step b) is acquired from a hookload at the surface or from a high sampling rate sensor below a top drive that provides torque to the drill-string.

A method of automatically controlling drilling weight-on-bit for using a drill-string to drill along a wellbore, wherein in step b) rotary speed (RPM) of the drill bit, pump pressure, and bit depth data are also acquired.

A method of automatically controlling drilling weight-on-bit for using a drill-string to drill along a wellbore, wherein the surface tension data is acquired only when the following conditions are met: the drill-string is out of slips; the drill bit is off-bottom near the bottom hole; the drill-string is rotating at drilling rates for rotary drilling; the pump-pressure is pumping at drilling rates for rotary and slide drilling; the drill-string is stationary for a predetermined period of time; and after condition e) is satisfied, the drill-string begins to move.

A method of automatically controlling drilling weight-on-bit for using a drill-string to drill along a wellbore, wherein the acquired surface tension data is further checked by the following criteria before the acquired surface tension data can be employed: the drill-string is rotating at drilling rates; the drill-string begins to move downwards while excluding upwards movements; and set-point changes exceeding the weight of the added drill-string components are ignored.

A method of automatically controlling drilling weight-on-bit for using a drill-string to drill along a wellbore, wherein in step c) the friction coefficient-depth distribution is obtained by c-1A) calculating the tension at the bottom of the drill-string using the following Equations:

$$F_T^k = F_T^{k-1} + w^k \cos(\theta^k) + \mu_k F_N^k$$

$$F_N^k = \sqrt{(F_T^{k-1}\delta\alpha\sin\theta^k)^2 + (F_T^{k-1}\delta\theta + w^k\sin\theta^k)^2} \qquad (1)$$

wherein $F_T^k$ is the tension at the top of the kth string component, and $F_N^k$ is the normal force, $w^k$ is the buoyant weight, $\theta^k$ is inclination, $\mu_k$ is the effective friction coefficient of the $k^{th}$ drill-string component, $\delta\alpha$ and $\delta\theta$ are the difference in azimuth and inclination between the $k^{th}$ and $k-1^{th}$ drill-string components; c-1B) calculating the tension at the bottom of the lower drill-string component using the bottom tension of the top upper drill-string component as the top tension of the lower string component, until obtaining the tension at the top of the deepest drill-string component $F_T^1$; c-1C) calculating $\mu_k$ by using $F_T^1$ in Equation (1) and assuming the drill bit is off bottom; c-1D) attributing the drill-string friction coefficient to the wellbore of the corresponding depth; and c-1E) repeating steps c-1A) to c-1D) when a new drill-string component is added.

A method of automatically controlling drilling weight-on-bit for using a drill-string to drill along a wellbore, wherein if the drill-string is under a compression force $F_{cr}$:

$$F_{cr} \geq (4\sqrt{2} - 2)\left(EI\beta w \frac{\sin\theta}{r}\right)^{1/2} \quad (2)$$

where E is the Young's modulus, I is the polar moment, is the buoyancy factor, w is the linear density, $\theta$ is the inclination of the well, and r is the radius of the wellbore, then the surface tension data is calibrated by the following equation:

$$F_T^k = -2\left(EI\beta w \frac{\sin\theta}{r}\right)^{1/2} \quad (3)$$

$$\tan\left(\mu^k \Delta L \left[\frac{r\beta w \sin\theta}{4EI}\right]^{\frac{1}{2}} - \tan^{-1}\left\{F_T^{k-1}\left[\frac{r}{4EI\beta w \sin\theta}\right]^{1/2}\right\}\right)$$

where $F_T^k$ is the tension at the top of the kth string component, $\mu_k$ is the effective friction coefficient of the $k^{th}$ drill-string segment, and $\Delta L$ is the change of length for that joint.

A method of automatically controlling drilling weight-on-bit for using a drill-string to drill along a wellbore, wherein in step c) the friction coefficient-depth distribution is obtained by the following steps: c-2A) measuring and recording off-bottom tension at the top of the drill-string after adding a new drill-string component while also storing drill-string parameters, wherein the drill-string parameters including wellbore geometry, drill-string length, and drill-string tension according to the time of recording; c-2B) selecting a friction coefficient at each depth that minimizes an objective function $J(\vec{\mu})$, wherein the objective function $J(\vec{\mu})$ is the total sum of the norm of the differences between the measured surface tension and the predicted off-bottom surface tension under the corresponding drill-string parameters according to the following equation:

$$J(\vec{\mu}) = \Sigma_i^n |d_i - F_i(\vec{\mu})|^m \quad (4)$$

wherein n is the number of historical surface tension data stored by the method, $d_i$ is the ith measured off-bottom surface tension, $F_i(\vec{\mu})$ is the model predicted surface tension when the drill bit is off bottom for a friction coefficient profile $\vec{\mu}$; m is a positive number, and || denotes absolute value; wherein $F_i(\vec{\mu})$ equals $F_T^k$ in step c-1A); c-2C) storing all or part of the selected friction coefficient profile from step 3b-2) to the current model; and c-2D) deleting the oldest stored off-bottom tension and the drill-string parameters when the number of the stored off-bottom tension and the drill-string parameters exceeds a predetermined value.

A method of automatically controlling drilling weight-on-bit for using a drill-string to drill along a wellbore, wherein m=2 and n=10.

A method of automatically controlling drilling weight-on-bit for using a drill-string to drill along a wellbore, wherein step d) further comprises: d-1A) selecting, by a user, a surface weight on bit (SWOB) as the differences between the surface tension used for drilling and the surface tension of rotating off-bottom when lowering the drill-string inside the wellbore; d-1B) using the selected SWOB to calculate the surface tension and the tension at each lower drill-string component and the drill bit by using the friction model in step c), wherein a downhole weight on bit (DWOB) is taken as the negative of the tension at the drill bit.

A method of automatically controlling drilling weight-on-bit for using a drill-string to drill along a wellbore, wherein step d) further comprising: d-1C) calculating a transfer ratio as DWOB/SWOB.

A method of automatically controlling drilling weight-on-bit for using a drill-string to drill along a wellbore, wherein step d) further comprising: d-2A) selecting, by a user, a DWOB value; d-2B) inputting the selected DWOB value into the friction coefficient model in step c), wherein the tension at the drill bit is set as the negative value of the selected DWOB; d-2C) calculating the surface tension using the friction coefficient model in step c) to obtain SWOB; and d-2D) automatically adjusting the SWOB.

The following abbreviations are used herein:

| ABBREVIATION | TERM |
| --- | --- |
| BHA | Bottom hole assembly |
| WOB | Weight on bit |
| SWOB | Surface weight on bit |
| DWOB | Downhole weight on bit |
| TOB | torque on bit |

DETAILED DESCRIPTION

The disclosure provides a novel method for estimating and automatically controlling the downhole WOB, through processing and optimization of real time surface data. No calibration using downhole data is required. The method will be discussed in detail accompanying FIG. 2.

Figure 1:
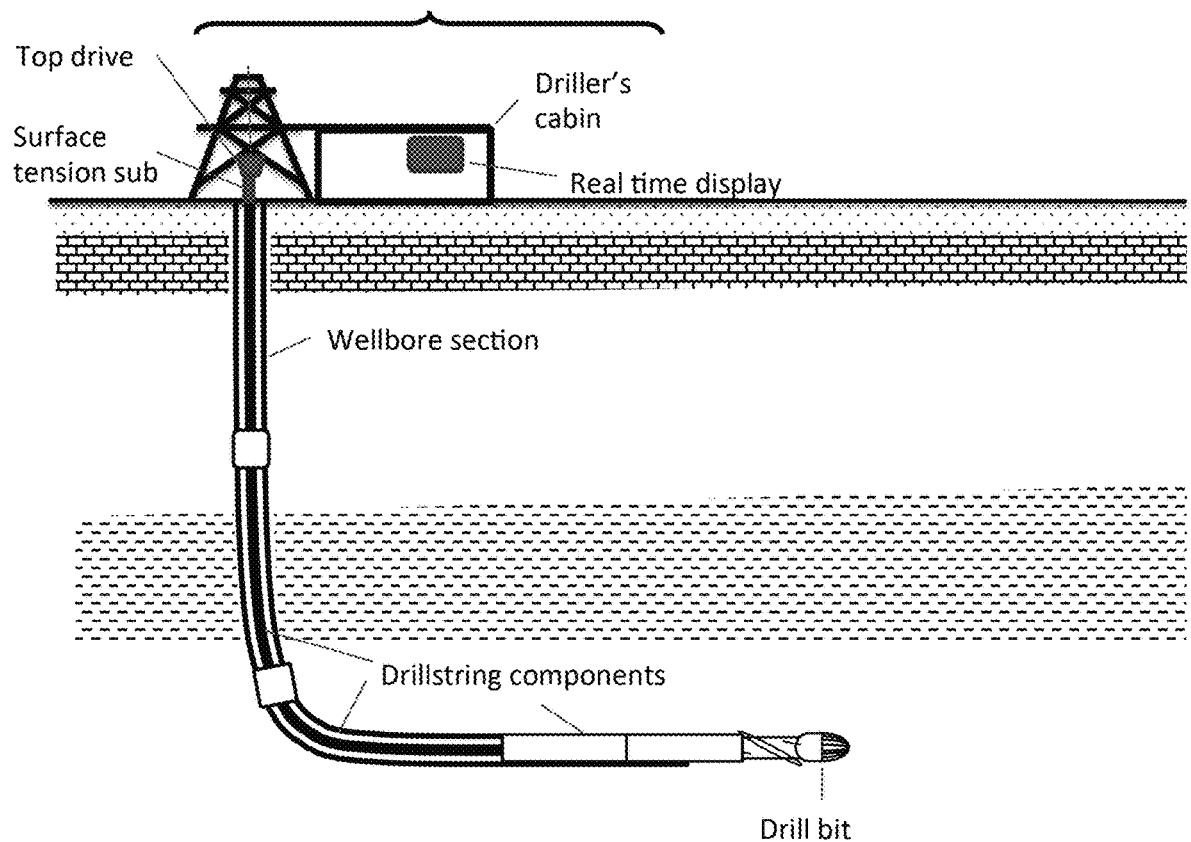
FIG. 1. An illustration of drilling a horizontal well.
Figure 2:
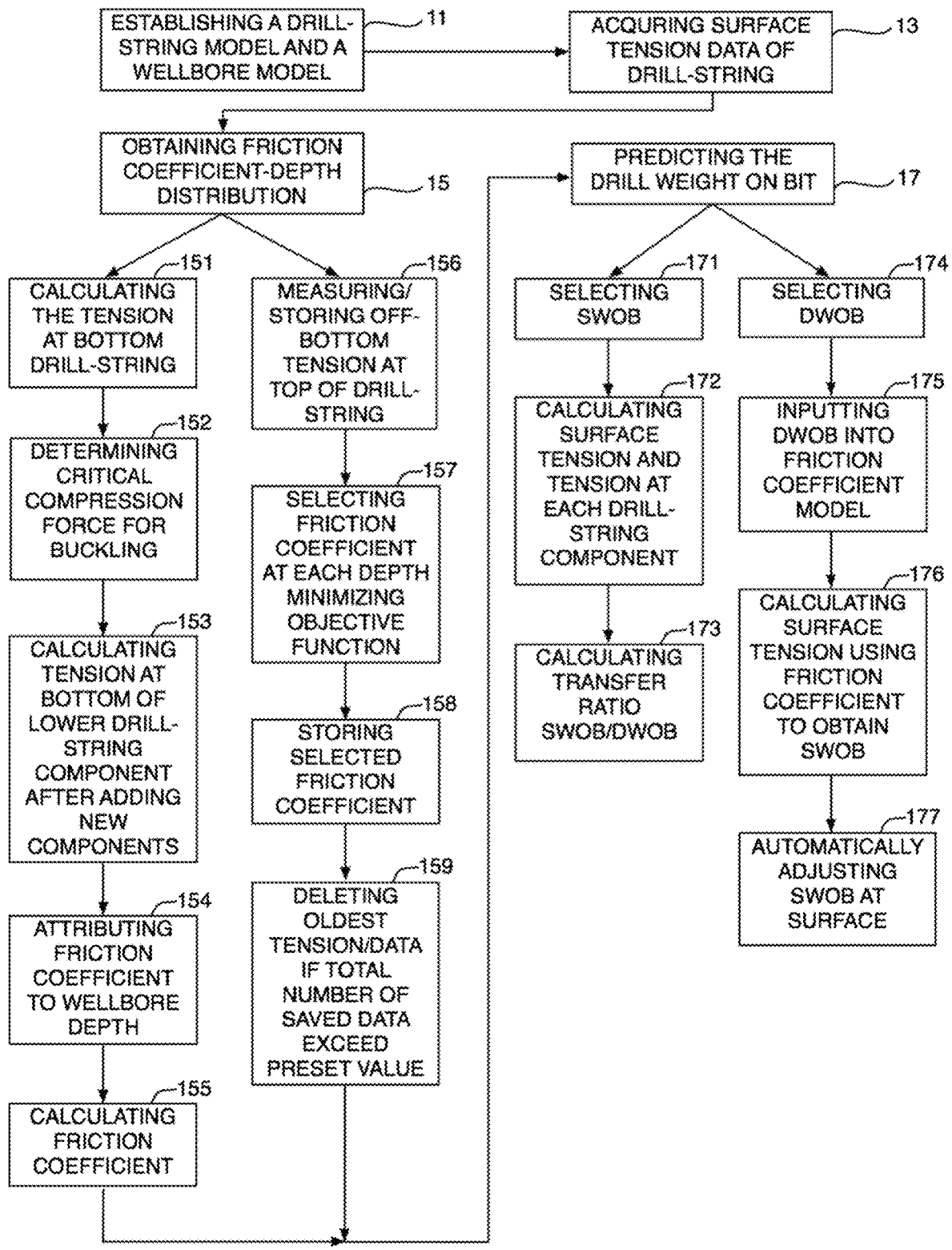
FIG. 2. A flow diagram of the method of this disclosure.

FIG. 2 is a flow diagram of the disclosed method. The method comprises four major steps: (1) step 11 constructing a drill-string and wellbore model in the computer software; (2) step 13 acquiring surface tension data when drill bit is off-bottom; (3) step 15 obtaining friction coefficient-depth distribution by calibrating the drill-string wellbore friction model using acquiring surface tension measurements; and (4) step 17 predicting and controlling downhole WOB using surface tension data and the drill-string/wellbore models. One or more steps may be performed during drilling of each one section of pipe.

In step 11, computer software models of the drill-string and the wellbore are constructed. The well bore model is constructed from a list of well sections, each with specified diameter, depth, length and heading. Each section also has a friction coefficient which is set to a default value in this step. The drill-string model is constructed from a list of drill-string components, including the BHA, the drill pipes, and the transition pipes. Each component has a specified diameter, length, weight, density and moment of inertia. As drill-string components are added from the top, the drill bit is lowered into the well bore, and the depth, location and contact points of each string components are automatically updated with the addition of each drill-string component.

In step 13, surface tension data from the deadline (hook-load) or from a high sampling rate sensor below the top drive is continuously monitored, along with rotary speed (RPM), pump pressure and bit depth, among other channels. After a new drill-string component is added, a tension reading is recorded as the off-bottom calibration setpoint when all of the following conditions are satisfied: (1) the drill-string is out of slips; (2) the drill bit is off-bottom near the bottom hole; (3) the drill-string is rotating at drilling rates for rotary drilling; (4) the pump-pressure is pumping at drilling rates for rotary and slide drilling; (5) the drill-string is stationary for a predetermined period of time; and (6) after condition (5) is satisfied, the drill-string begins to move. The stationary period of time is to ensure that all forces that could affect the hookload reading have reached a balance on the drill-string, so as to avoid incorrect readings.

Due to the internal and external noise in the surface data, such as friction in the drill-string, transient elastic deformation and instrument calibration errors, the measured off-bottom tension setpoint may contain undesired noise. The following additional checking criteria are applied to quality check the measurements and only measurements meeting the requirements are used in the calibration step 15: (1) the drill-string is rotating at drilling rates; (2) the drill-string begins to move downwards while excluding upwards movements; and (3) set-point changes exceeding the weight of the added drill-string components are ignored. These data-selection conditions and checking criteria ensures that the acquired surface tension data contains minimum noise and maximum accuracy.

In step 15, the selected surface tension setpoint data is imported to a calibration algorithm, in order to determine the most accurate friction coefficient-depth distribution that satisfies the tension data. Step 15 comprises two alternative routes. Route 1, a direct solution approach, is from step 151 to 155, and route 2, an optimization approach, is from step 156 to 159.

Direct Solution Approach:
In this method, for each new drill-string component being added, the friction coefficient of the deepest section of the well is calculated, while the friction coefficients of other wellbore sections are fixed. The solution process is as follows:

Step 151 Calculating the tension at the bottom of the drill-string based on the measured tension at the top of the drill-string from step (2), using the following equation:

$$F_T^k = F_T^{k-1} + w^k \cos(\theta^k) + \mu_k F_N^k$$

$$F_N^k = \sqrt{(F_T^{k-1}\delta\alpha\sin\theta^k)^2 + (F_T^{k-1}\delta\theta + w^k\sin\theta^k)^2} \quad (1)$$

wherein $F_T^k$ is the tension at the top of the kth string component, and $F_N^k$ is the normal force, $w^k$ is the buoyant weight, $\theta^k$ is inclination, $\mu_k$ is the effective friction coefficient of the kth drill-string component, $\delta\alpha$ and $\delta\theta$ are the difference in azimuth and inclination between the $k^{th}$ and $k-1^{th}$ drill-string components. Particularly, $\delta\alpha$ and $\delta\theta$ are taking into account that the wellbore is not vertical, and therefore both friction force and buoyant force (by the drilling fluid) would negatively affect the desirable downhole weight on bit.

Step 152

Equation 1 works in most cases where drillstring is under tension or moderate compression. When drillstring is under large compression, buckling can occur and weight-on-bit transfer efficiency is greatly reduced. According to Wu and Juvkam-Wold (1993), the critical compression for helical buckling is:

$$F_{cr} = (4\sqrt{2} - 2)\left(EI\beta w \frac{\sin\theta}{r}\right)^{1/2} \quad (2)$$

where E is the Young's modulus, I is the polar moment, $\beta$ is the buoyancy factor, w is the linear density. $\theta$ is the inclination of the well, and r is the radius of the wellbore. Therefore, when the tension at an segment of the drill-string exceeds the critical compression for buckling for this segment, the tension transfer equation becomes:

$$F_T^k = -2\left(EI\beta w\frac{\sin\theta}{r}\right)^{1/2}$$
$$\tan\left(\mu^k \Delta L\left[\frac{r\beta w\sin\theta}{4EI}\right]^{\frac{1}{2}} - \tan^{-1}\left\{F_T^{k-1}\left[\frac{r}{4EI\beta w\sin\theta}\right]^{1/2}\right\}\right) \quad (3)$$

For each drill-string component, compression is calculated and compared to the critical buckling compression, then one of the two above equations (equation (1) for standard and equation (3) for buckling) is used.

Step 153

Using the bottom tension of the top upper string component as the top tension of the lower string component, subsequently calculating the tension at the bottom of the lower drill-string component, until obtaining the tension at the top of the deepest string component, $F_T^1$.

Step 154

From $F_T^1$ and assuming that the bit is off-bottom ($F_T^0=0$), friction coefficient $\mu^k$ can be calculated using equation (1).

Step 155

The string friction coefficient $\mu^k$ is attributed to the wellbore of the corresponding depth for each drill-string component, and is fixed for future calculations.

Steps 151-155 are repeated when each new pipe section or drill-string component is added to the drill-string, and the result is automatically updated.

This direct solution approach will obtain the true friction coefficient if the data is noise free. However, when the measured tension and other data contain errors, which they often do, the calculated friction coefficient will be unstable and thus producing incorrect results.

Optimization Approach:
Under this approach, not only the latest off-bottom tension reading, but a collection of historical surface tension measurements are taken into account to derive the optimal friction coefficients. The optimization process is as follows:

Step 156

After adding each drill string component, and before on-bottom drilling, record the measured off-bottom tension at the top of the string. This measurement is added to a list of previous measurements and is stored in the memory of the computer. The parameters regarding the current state of the drill-string, such as geometry, length, tension and other information, is also stored in a list. The list comprises other previous states of drill-string when off-bottom tensions are measured.

Step 157

Selecting a friction coefficient profile, containing constant or different friction coefficients at each depth, that minimizes an objective function, which is the total sum of the norm of the differences between each measured surface tension and the predicted off-bottom surface tension under the corresponding drill-string state using such friction coefficient profile:

$$J(\vec{\mu})=\Sigma_i^n |d_i - F_i(\vec{\mu})|^m \qquad (4)$$

in which n is the number of historical surface tension data stored by the algorithm, $d_i$ is the $i^{th}$ measured off-bottom surface tension, $F_i(\vec{\mu})$ is the model predicted surface tension when bit is off bottom for a friction coefficient profile $\vec{\mu}$; m is a positive number, ∥ denotes absolute value. In a preferred embodiment, m=2 and n=10.

Step 158

All or part of the selected friction coefficient profiles from the previous step are stored and updated to the current model.

Step 159

When the number of stored surface tension measurements and drill-string states exceeds a predefined value, delete the oldest data and drill string state from the list. For example, if the total number of stored surface tension measurements and drill-string state exceeds 100, the oldest stored surface tension and drill-string state are then deleted from the list, therefore keeping the list most recent and updated.

Figure 3:
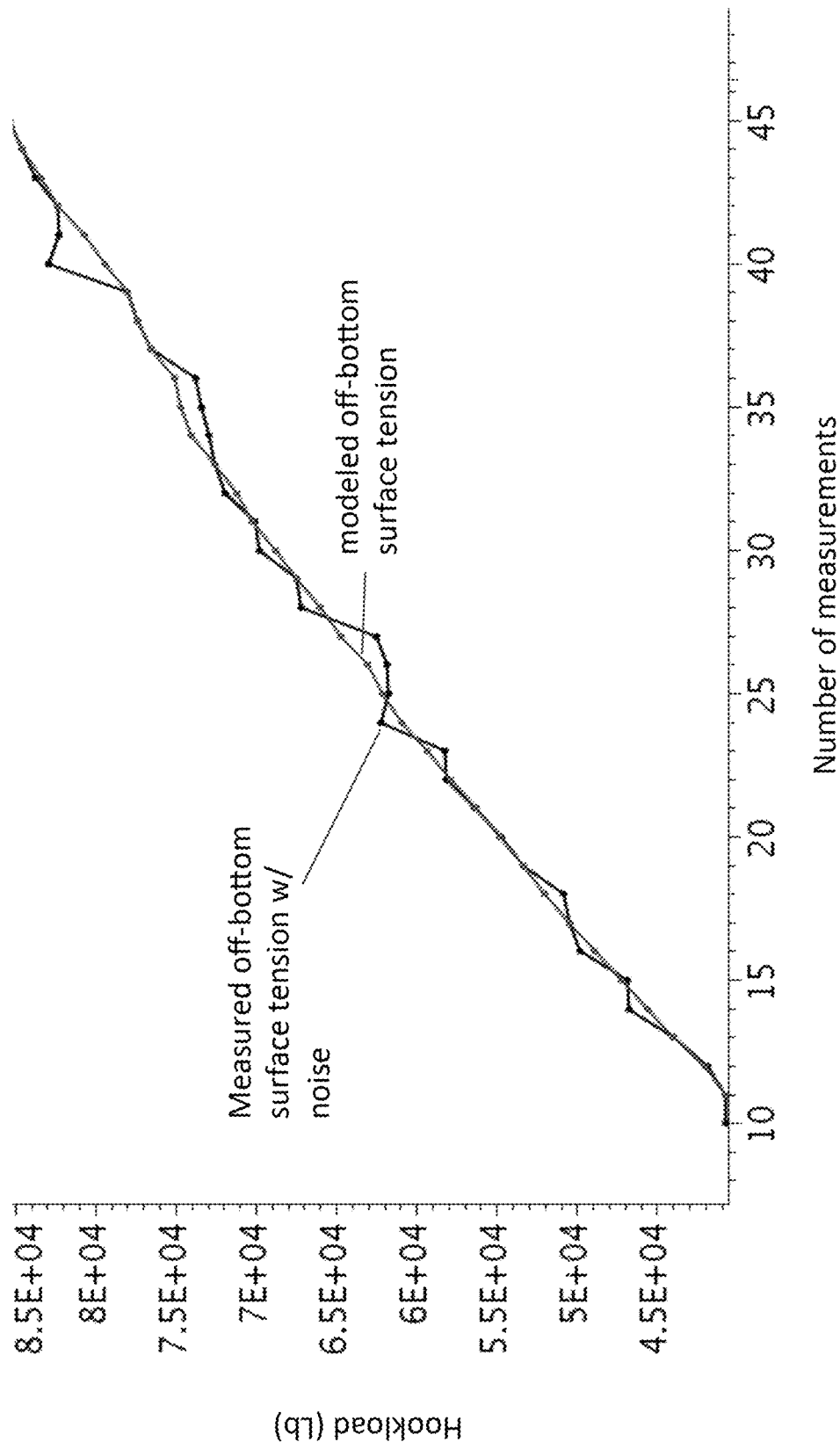
FIG. 3. Measured surface tension vs. modeled surface tension while off-bottom.
Figure 4:
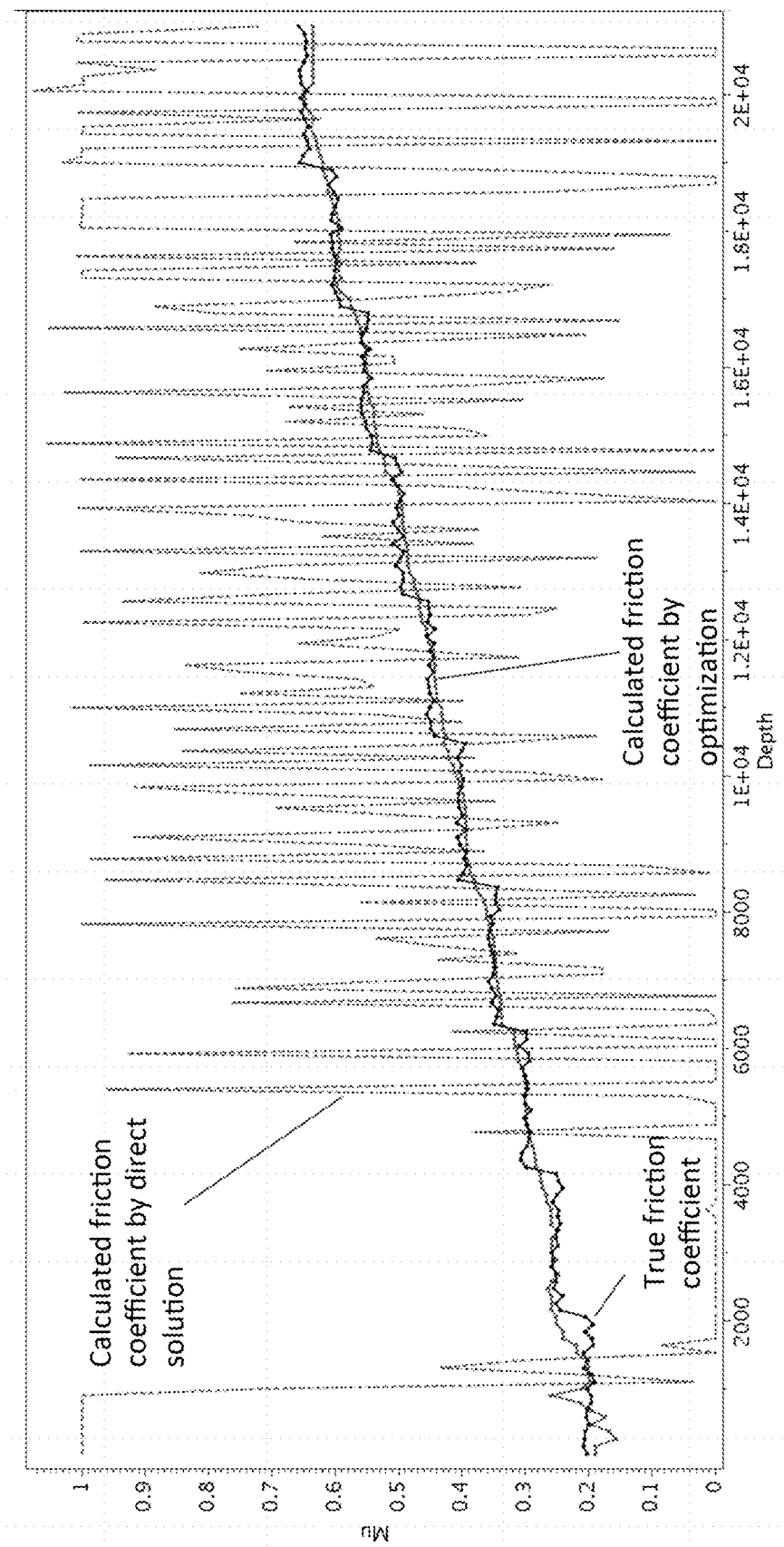
FIG. 4. Calculated friction model vs. true synthetic friction model.

FIG. 3-4 show that the optimization approach is stable when large noise in the data is present, because it considers the history of previous data and is able to reduce the effect of any outlier measurements.

After the friction coefficient-depth distribution is established, a user can then choose to either predict or automatically control the downhole weight on bit in step 17. The previously determined friction coefficient model is used to predict and/or control downhole weight on bit during drilling operation. There are two modes of operation: Prediction mode and Control mode:

Prediction Mode:

In prediction mode, the driller manually selects a surface weight on bit (SWOB) in step 171. SWOB is the differences between surface tension used for drilling and rotating off-bottom when lowering the drill-string.

In step 172, this manually selected SWOB value is then used to calculate the surface tension while drilling, and subsequently the tension at each lower drill-string component and the bit, using the estimated friction model from above-discussed step (3). The downhole weight on bit (DWOB) is taken as the negative of the tension at the bit.

Figure 5:
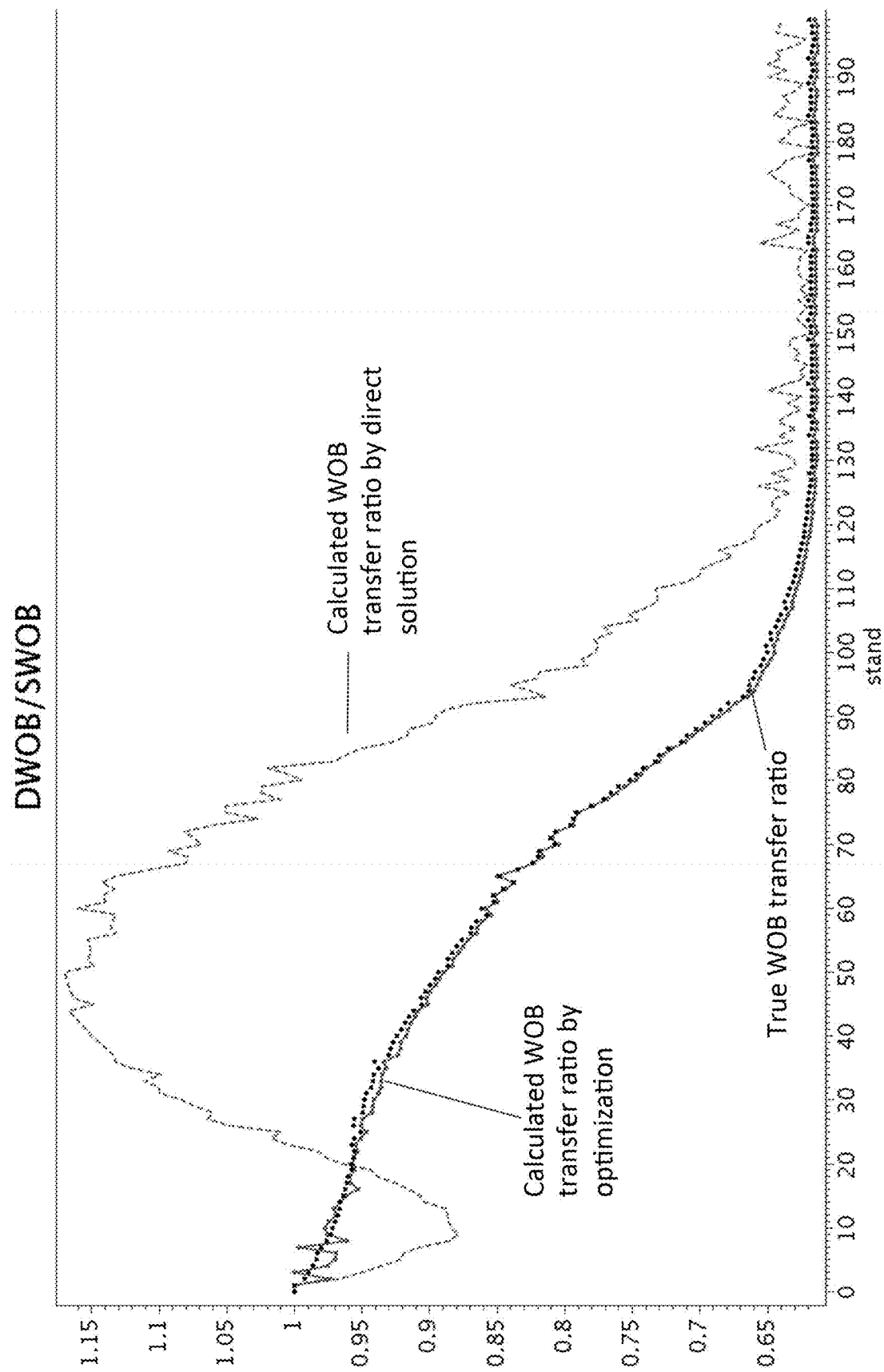
FIG. 5. Calculated WOB vs. true synthetic WOB transfer ratio.
Figure 6:
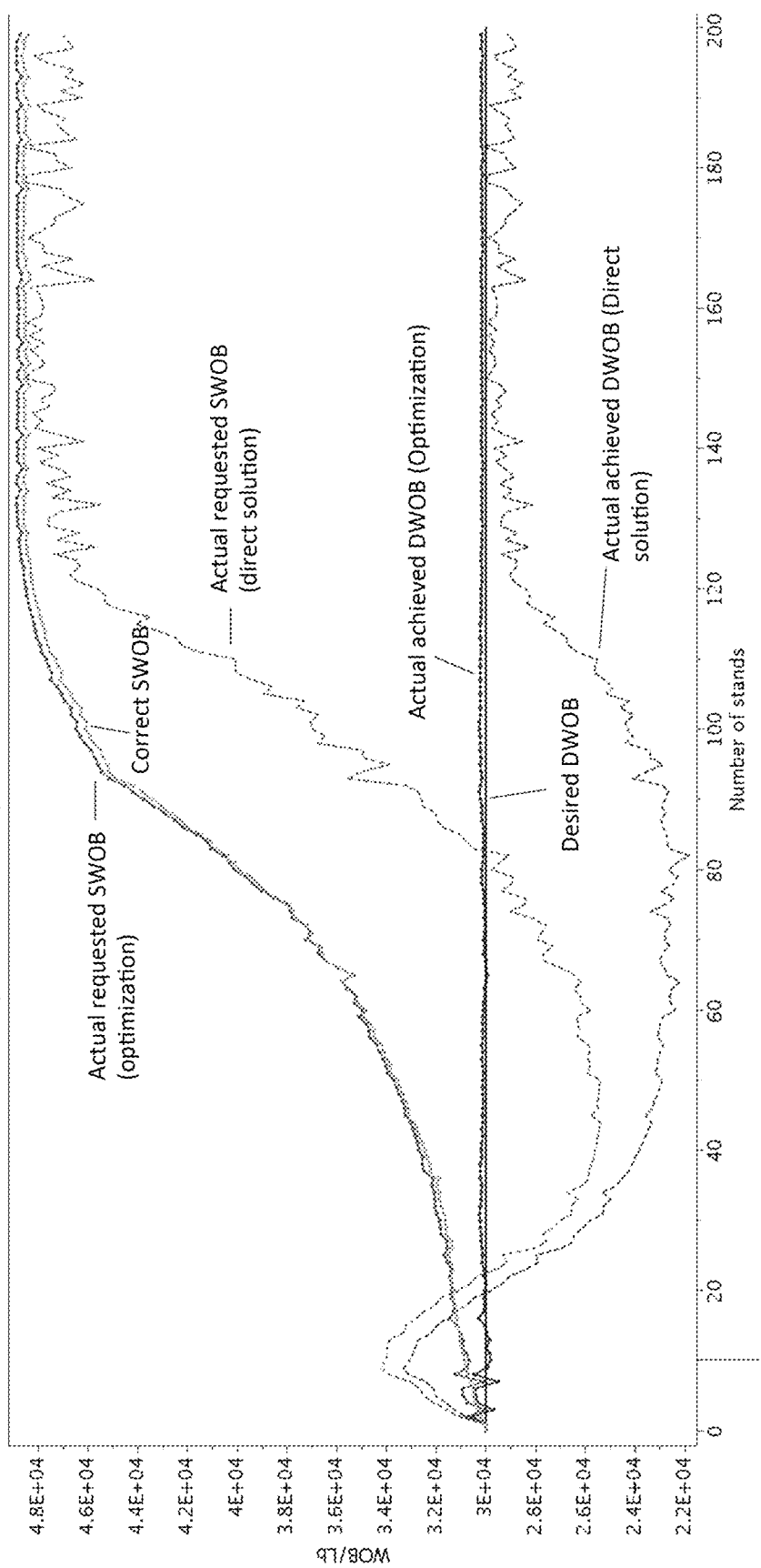
FIG. 6. Requested WOB vs. actual WOB.

In step 173, a transfer ratio is also calculated as DWOB/SWOB. Both DWOB and the ratio are displayed in a computer monitor with the driller selected SWOB. Driller will adjust SWOB selection according to the displayed values. An exemplary comparison transfer ratio between those calculated by direction solution and by optimization is shown in FIG. 5. It is shown that the optimization approach provides transfer ratio much closer to the actual transfer ratio.

Control Mode:

In control mode, the driller selects a DWOB that is to be achieved at the drill bit in step 174. Note that in the control mode, once DWOB is selected, all the calculations are automated all the way to the SWOB to be applied at the top drive, using the method discussed above.

In step 175, this selected DWOB value is input into the computer software and the model will set the tension at the bit to be the negative of the desired DWOB. Drill-string tension at each upper component is calculated using the friction model obtained in step (3) until the desired surface tension is obtained.

In step 176, this desired surface tension is then used to calculate the correct SWOB, which is automatically sent to the autodriller without requiring action from the driller. The SWOB at the surface is then adjusted in step 177 without any further human input, as expressed in the equation below:

$$SWOB_{requested} = F_T^k \text{offbottom} - F_T^k \text{requested} \qquad (5)$$

In both prediction modes and control modes, the presence of buckling can be predicted and the depth range of buckling communicated to the rig, and therefore suitable adjustment of the SWOB can be performed.

The method presented in this disclosure has the following advantages:

1. There is no need for continuously monitoring downhole data because the optimization approach incorporates historical data to more accurately model and calculate friction coefficient and SWOB.

2. By using only real time hi-fidelity surface data it is possible to create and update well bore friction models very close to true values.

3. The algorithm is automated to capture hookload during different drilling states, when drill-string is rotating off bottom, tripping in or pulling up. This eliminates human error during the process.

4. A real-time optimization algorithm is provided to determine friction model from the collection of historical surface hookload data, which is robust even when data is noisy and contain errors.

5. A real-time estimate of drill bit WOB is based on all historical data and calculates hookload needed to achieve specific true WOB downhole.

6. A real-time prediction of the presence and depth of drill-string buckling is also provided, and the algorithm also provides different calculations for both normal and buckling drill-string components.

7. With the real-time, accurate prediction of DWOB, it is possible to display to driller in an integrated visualizer (DEEPcam) of the downhole drilling. This would greatly improve a driller's ability to further adjust SWOB/DWOB in the case of unforeseeable conditions during drilling.

What is claimed is:

1. A method of automatically controlling a drilling weight-on-bit (DWOB) for using a drill-string to drill along a wellbore, the method comprising:
    establishing a drill-string model and a wellbore model, wherein the drill-string has a plurality of components along a length thereof, and the wellbore has a plurality of sections;

acquiring surface tension data of the drill-string;
obtaining a friction coefficient-depth distribution by calibrating the surface tension data in the drill-string model and the wellbore model, wherein calibrating the surface tension data in the drill-string model and the wellbore model produces a calibrated drill string model and a calibrated wellbore model;
generating a prediction of the (DWOB) according to the calibrated drill-string model and the calibrated wellbore model; and
controlling the DWOB by adjusting a surface weight-on-bit (SWOB) based on the prediction,
wherein the surface tension data is acquired when the drill-string is out of slips; a drill bit disposed on the drill-string is off bottom near a bottom hole; the drill-string is rotating at drilling rates for rotary drilling; a pump pressure is pumping at drilling rates for rotary and slide drilling; the drill-string has been stationary for a predetermined period of time; and/or after the predetermined period of time the drill-string begins to move downward and rotate.

2. The method of claim 1, wherein the wellbore model is established according to a list of the plurality of sections, with each of the plurality of sections having a specified diameter, depth, length, heading and friction coefficient.

3. The method of claim 1, wherein the drill-string model is established according to a list of the plurality of components along the drill-string, each one of the plurality of components having a specified diameter, length, weight, density and moment of inertia.

4. The method of claim 1, wherein when additional components are added to the drill-string so as to lower the drill bit within the wellbore, the drill-string model is automatically updated for depth, location, and contact points of each of the additional components.

5. The method of claim 1, wherein the surface tension data is acquired from at least one of a hookload at a surface or a high sampling rate sensor below a top drive that provides torque to the drill-string.

6. The method of claim 1, wherein acquiring the surface tension data further comprises acquiring at least one of a rotary speed (RPM) of the drill bit, the pump pressure, or a bit depth.

7. The method of claim 1, wherein the surface tension data is checked by confirming that:
the drill-string is rotating at drilling rates for rotary drilling;
the drill-string begins to move downwards after having been stationary for the predetermined period of time, while excluding upwards movements; and
set-point changes exceeding a weight of added drill-string components are ignored.

8. The method of claim 1, wherein the friction coefficient-depth distribution is obtained by:
calculating a drill-string bottom tension at a bottom of the drill-string using the following Equations:

$$F_T^k = F_T^{k-1} + w^k \cos(\theta^k) + \mu_k F_N^k$$

$$F_N^k = (F_T^{k-1}\delta\alpha \sin\theta^k)^2 + (F_T^{k-1}\delta\theta + w^k \sin\theta^k)^2 \quad (1)$$

wherein $F_K^T$ is a $k^{th}$ component top tension at a top of a $k^{th}$ drill-string component, $F_N^k$ is a normal force, $w^k$ is a buoyant weight, $\theta^k$ is inclination, $\mu_k$ is an effective friction coefficient of the $k^{th}$ drill-string component, and $\delta\alpha$ and $\delta\theta$ are a difference in azimuth and inclination between the $k^{th}$ drill-string component and a k-1$^{th}$ drill-string component;

calculating a lower component bottom tension at a bottom of a lower drill-string component using an upper component bottom tension of an upper drill-string component as a lower component top tension at the top of the lower drill-string component, until obtaining a deepest component top tension at a top of a deepest drill-string component $F_T^1$;
calculating $\mu_k$ by using $F_T^1$ in Equation (1) and assuming the drill bit is off bottom;
attributing the drill-string friction coefficient depth distribution to the wellbore of a corresponding depth; and
repeating calculation of the drill-string bottom tension at the bottom of the drill string using Equation (1), calculation of the lower component bottom tension at the bottom of the lower drill-string component, calculation of $\mu_k$ by using $F_T^1$ in Equation (1), and attribution of the drill-string friction coefficient depth distribution to the wellbore of the corresponding depth when a new drill-string component is added.

9. The method of claim 8, wherein if the drill-string is under a compression force $F_{cr}$, $$F_{cr} \geq (4\sqrt{2} - 2)\left(EI\beta w \frac{\sin\theta}{r}\right)^{1/2} \quad (2)$$

wherein E is Young's modulus, I is a polar moment, $\beta$ is a buoyancy factor, w is a linear density, $\theta$ is an inclination of the wellbore, and r is a radius of the wellbore, then the surface tension data is calibrated by the following equation:

$$F_T^k = -2\left(EI\beta w \frac{\sin\theta}{r}\right)^{1/2} \tan\left(\mu^k \Delta L\left[\frac{r\beta w \sin\theta}{4EI}\right]^{\frac{1}{2}} - \tan^{-1}\left\{F_T^{k-1}\left[\frac{r}{4EI\beta w \sin\theta}\right]^{1/2}\right\}\right) \quad (3)$$

wherein $F_T^k$ is the $k^{th}$ component top tension at the top of the $k^{th}$ drill-string component, $\mu_k$ is the effective friction coefficient of the $k^{th}$ drill-string component, and $\Delta L$ is a change of length for a joint.

10. The method of claim 9, wherein the friction coefficient-depth distribution is obtained by:
measuring and storing off-bottom tension at the top of the drill-string after adding the new drill-string component while also storing drill-string parameters, wherein the drill-string parameters include wellbore geometry, drill-string length, and drill-string tension at a time of storing;
selecting a friction coefficient at each corresponding depth that minimizes an objective function $J(\vec{\mu})$, wherein the objective function $J(\vec{\mu})$ is a total sum of a norm of differences between a measured surface tension and a predicted off-bottom surface tension under the corresponding drill-string parameters according to the following equation:

$$J(\vec{\mu}) = \Sigma_i^n |d_i - F_i(\vec{\mu})|^m \quad (4)$$

wherein n is a number of off-bottom tension stored, $d_i$ is an $i^{th}$ measured off-bottom surface tension, $F_i(\vec{\mu})$ is a model predicted surface tension when the drill bit is off bottom for a friction coefficient profile $\vec{\mu}$; m is a positive number, and ‖ denotes absolute value; wherein $F_i(\vec{\mu})$ equals $F_T^k$ in Equation (1);

storing all or part of the coefficients to the drill-string model and the wellbore model; and deleting an oldest stored off-bottom tension and an oldest stored of each of the drill-string parameters when the number of the stored off-bottom tension and the stored drill-string parameters exceeds a predetermined value.

11. The method of claim 10, wherein m=2 and n=10.

12. The method of claim 10, wherein the predetermined value is 10.

13. The method of claim 1, wherein generating a prediction of the DWOB further comprises:

selecting, by a user, the SWOB as differences between a first surface tension used for drilling and a second surface tension of rotating off-bottom when lowering the drill-string inside the wellbore; and using the SWOB to calculate a third surface tension and a tension at each lower drill-string component and the drill bit by using the calibrated drill-string and wellbore models, wherein DWOB is taken as a negative of the tension at the drill bit.

14. The method of claim 13, wherein generating a prediction of the DWOB further comprises:

calculating a transfer ratio as DWOB/SWOB.

15. The method of claim 1, wherein controlling the DWOB further comprises:

selecting, by a user, a DWOB value, inputting the DWOB value into the calibrated drill-string model and the calibrated wellbore model, wherein a tension at the drill bit is set as a negative value of the DWOB, and calculating a surface tension using the calibrated drill-string model and the calibrated wellbore model to obtain a SWOB value; and automatically adjusting the SWOB based on the SWOB value.

16. A system for automatically controlling DWOB to drill along a wellbore, the system comprising:

a drill-string having at least a bottom hole assembly (BHA), transition pipes, and drill pipes, and the BHA comprising a drill bit, drill collars, and drilling stabilizers;

a sensor for measuring surface tension data of the drill-string;

a computer having a processor and a memory;

an algorithm stored in the memory to be executed by the processor, the algorithm comprising:

establishing a drill-string model for the drill-string and a wellbore model for the wellbore, wherein the wellbore includes a plurality of sections;

acquiring the surface tension data of the drill-string, wherein the surface tension data is acquired when the drill-string is out of slips; the drill bit is off bottom near a bottom hole; the drill-string is rotating at drilling rates for rotatory drilling; a pump pressure is pumping at drilling rates for rotary and slide drilling; the drill-string has been stationary for a predetermined period of time; and/or after the predetermined period of time the drill-string begins to move downward and rotate;

obtaining a friction coefficient-depth distribution by calibrating the surface tension data;

generating a prediction of the DWOB according to a calibrated drill-string and wellbore model, the DWOB being controlled by adjusting a SWOB.

17. The system of claim 16, wherein the surface tension data is further checked by confirming that:

the drill-string is rotating at drilling rates;

the drill-string begins to move downwards while excluding upwards movements; and set-point changes exceeding a weight of added drill-string components are ignored.

18. The system of claim 16, wherein the friction coefficient-depth distribution is obtained by:

calculating a drill-string bottom tension at a bottom of the drill-string using the following Equations:

$$F_T^k = F_T^{k-1} + w^k \cos(\theta^k) + \mu_k F_N^k$$

$$F_N^k = (F_T^{k-1}\delta\alpha \sin \theta^k)^2 + (F_T^{k-1}\delta\theta + w^k \sin \theta^k)^2 \qquad (1)$$

wherein $F_T^k$ is a $k^{th}$ component top tension at a top of a $k^{th}$ drill-string component, $F_N^k$ is a normal force, $w^k$ is a buoyant weight, $\theta^k$ is inclination, $\mu_k$ is an effective friction coefficient of the $k^{th}$ drill-string component, and $\delta\alpha$ and $\delta\theta$ are a difference in azimuth and inclination between the $k^{th}$ drill-string component and a $k-1^{th}$ drill-string component;

calculating a lower component bottom tension at a bottom of a lower drill-string component using an upper component bottom tension of an upper drill-string component as a lower component top tension of the lower string component, until obtaining a deepest component top tension at a top of a deepest drill-string component $F_T^1$;

calculating $\mu_k$ by using $F_T^1$ in Equation (1) and assuming the drill bit is off bottom;

attributing the drill-string friction coefficient to the wellbore of a corresponding depth; and repeating calculation of the drill-string bottom tension at the bottom of the drill string using Equation (1), calculation of the lower component bottom tension at the bottom of the lower drill-string component, calculation of $\mu_k$ by using $F_T^1$ in Equation (1), and attribution of the drill-string friction coefficient to the wellbore of the corresponding depth when a new drill-string component is added.

19. The system of claim 16, wherein if the drill-string is under a compression force $F_{cr}$, $$F_{cr} \geq (4\sqrt{2} - 2)\left(EI\beta w \frac{\sin\theta}{r}\right)^{1/2} \qquad (2)$$

wherein E is a Young's modulus, I is a polar moment, $\beta$ is a buoyancy factor, w is a linear density, $\theta$ is an inclination of the wellbore, and r is a radius of the wellbore, then the surface tension data is calibrated by the following equation:

$$F_T^k = -2\left(EI\beta w \frac{\sin\theta}{r}\right)^{1/2} \qquad (3)$$

$$\tan\left(\mu^k \Delta L\left[\frac{r\beta w \sin\theta}{4EI}\right]^{\frac{1}{2}} - \tan^{-1}\left\{F_T^{k-1}\left[\frac{r}{4EI\beta w \sin\theta}\right]^{1/2}\right\}\right)$$

wherein $F_T^k$ is a $k^{th}$ component top tension at a top of a $k^{th}$ drill-string component, $\mu_k$ is the effective friction coefficient of the $k^{th}$ drill-string component, and $\Delta L$ is a change of length for a joint.

20. The system of claim 16, wherein the friction coefficient-depth distribution is obtained by:

measuring and storing off-bottom tension at a top of the drill-string after adding a new drill-string component while also storing drill-string parameters, wherein the drill-string parameters include wellbore geometry, drill-string length, and drill-string tension according to a time of recording;

selecting a friction coefficient at each corresponding depth that minimizes an objective function $J(\vec{\mu})$, wherein the objective function $J(\vec{\mu})$ is a total sum of a norm of differences between a measured surface tension and a predicted off-bottom surface tension under the corresponding drill-string parameters according to the following equation:

$$J(\vec{\mu}) = \Sigma_i^n |d_i - F_i(\vec{\mu})|^m \quad (4)$$

wherein n is a number of off-bottom tension data stored, $d_i$ is an $i^{th}$ measured off-bottom surface tension, $F_i(\vec{\mu})$ is a model predicted surface tension when the drill bit is off bottom for a friction coefficient profile $\vec{\mu}$; m is a positive number, and $\|$ denotes absolute value; wherein $F_i(\vec{\mu})$ equals $F_T^k$ in Equation (1);

storing all or part of the friction coefficients to the drill-string model and the wellbore model; and deleting an oldest stored off-bottom tension and an oldest of each of the drill-string parameters when the number of the stored off-bottom tension and the drill-string parameters exceeds a predetermined value.

21. The system of claim 16, wherein generating a prediction of the DWOB further comprises:

selecting, by a user, the SWOB as differences between a first surface tension used for drilling and a second surface tension of rotating off-bottom when lowering the drill-string inside the wellbore; and using the selected SWOB to calculate a third surface tension and a tension at each lower drill-string component and the drill bit by using the calibrated drill-string and wellbore models, wherein the DWOB is taken as a negative of the tension at the drill bit.

22. The system of claim 21, wherein generating a prediction of the DWOB further comprises:

calculating a transfer ratio as DWOB/SWOB.

23. The system of claim 16, wherein controlling the DWOB further comprises:

selecting, by a user, a DWOB value;

inputting the selected DWOB value into the calibrated drill-string model and the calibrated wellbore model in step iii), wherein the tension at the drill bit is set as a negative value of the selected DWOB;

calculating the surface tension using the calibrated drill string model and the calibrated wellbore model to obtain a SWOB value; and automatically adjusting the SWOB based on the SWOB value.

* * * * *